(12) United States Patent
Bansal et al.

(10) Patent No.: US 10,713,891 B2
(45) Date of Patent: Jul. 14, 2020

(54) GAMING SYSTEM PROVIDING FOR VARIABLE ANCILLARY NON-CASH AWARDS

(71) Applicant: Aristocrat Technologies Australia Pty Limited, North Ryde, NSW (AU)

(72) Inventors: Shailesh Bansal, Uttar Pradesh (IN); Harjeet Kaur, Uttar Pradesh (IN); Mohit Kumar, Uttar Pradesh (IN)

(73) Assignee: Aristocrat Technologies Australia Pty Limited, North Ryde, NSW (AU)

( * ) Notice: Subject to any disclaimer, the term of this patent is extended or adjusted under 35 U.S.C. 154(b) by 75 days.

(21) Appl. No.: 15/938,698

(22) Filed: Mar. 28, 2018

(65) Prior Publication Data

US 2019/0304252 A1 Oct. 3, 2019

(51) Int. Cl.
*G07F 17/32* (2006.01)
*G06Q 30/02* (2012.01)
*G07F 17/34* (2006.01)

(52) U.S. Cl.
CPC ..... *G07F 17/3244* (2013.01); *G06Q 30/0209* (2013.01); *G07F 17/3213* (2013.01); *G07F 17/34* (2013.01)

(58) Field of Classification Search
CPC ............. G07F 17/3258; G07F 17/3244; G07F 17/3213
See application file for complete search history.

(56) References Cited

U.S. PATENT DOCUMENTS

| | | |
|---|---|---|
| 5,695,402 A | 12/1997 | Stupak |
| 5,919,088 A | 7/1999 | Weiss |
| 6,270,409 B1 | 8/2001 | Shuster |
| 7,597,621 B2 | 10/2009 | Baerlocher |
| 7,744,453 B2 | 6/2010 | Pacey |
| 7,775,876 B2 | 8/2010 | Rowe |
| 7,931,530 B2 | 4/2011 | Englman |
| 8,177,633 B2 | 5/2012 | Peterson et al. |
| 8,298,072 B2 | 10/2012 | Saito et al. |
| 8,784,190 B2 | 7/2014 | Bond et al. |
| 8,834,261 B2 | 9/2014 | Powell et al. |
| 2003/0073487 A1 | 4/2003 | Okad |
| 2004/0002377 A1 | 1/2004 | McMain et al. |
| 2004/0053657 A1 | 3/2004 | Fiden et al. |
| 2010/0041468 A1 | 2/2010 | Baerlocher et al. |
| 2010/0331073 A1 | 12/2010 | Saito et al. |
| 2011/0003637 A1* | 1/2011 | LeFever ............... G07F 17/3258 463/27 |
| 2013/0137509 A1* | 5/2013 | Weber ................. G07F 17/3209 463/29 |
| 2013/0225262 A1 | 8/2013 | Thompson et al. |

* cited by examiner

*Primary Examiner* — David L Lewis
*Assistant Examiner* — Robert E Mosser
(74) *Attorney, Agent, or Firm* — McAndrews, Held & Malloy, Ltd.

(57) ABSTRACT

A gaming device for awarding a beverage to a player playing a wagering game. A display displays a graphical representation of a complimentary item or service. A game controller controls play of the wagering game and randomly determines an amount of the complimentary item or service to be graphically added to the displayed complimentary item or service in response to a play of the wagering game. An output mechanism awards the complimentary item or service when the graphical representation of the complimentary item or service is completely accumulated and activated by the player.

18 Claims, 8 Drawing Sheets

GAMING SYSTEM PROVIDING FOR VARIABLE ANCILLARY NON-CASH AWARDS

RELATED APPLICATIONS

[Not Applicable]

TECHNICAL FIELD

The present disclosure relates to gaming and wagering, and more specifically to electronic gaming machines that award ancillary non-cash prizes.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. The RNG may be used to randomly determine the outcome of a game and symbols may then be selected which correspond to that outcome or to randomly select the symbols whose resulting combinations determine the outcome. Notably, some games may include an element of skill on the part of the player and are therefore not entirely random.

Playing can be a frustrating experience when players have played for an extended period of time without winning. For example, if players are not winning or have not won any prizes even after playing a large number of games, players tend to stop gaming or leave the games early due to frustration. Ancillary awards may motivate players to continue playing. Even when players are winning, delays in award may also frustrate players. Thus, ancillary awards may heighten the excitement of winning, and temporarily quench the thirst of obtaining prizes associated with the winning. Thus, additional incentives may be needed to raise player morale.

SUMMARY

In some embodiments, a gaming device for awarding a beverage to a player playing a wagering game is provided. The gaming device includes a credit input mechanism that receives a physical item representing a monetary value. The credit balance increases and decreases based on wagering activity. A display displays the wagering game based on said wagering activity and a graphical representation of a beverage container. A game controller controls a play of the wagering game and randomly determines an amount of beverage to be graphically added to the displayed graphical representation of the beverage container in response to a play of the wagering game. An output mechanism awards a beverage when the beverage container is full and activated by the player In some other embodiments, a gaming device for awarding a beverage to a player playing a wagering game is provided. The gaming device includes a credit input mechanism that receives a physical item representing a monetary value. The credit balance increases and decreases based on wagering activity. A display displays the wagering game based on said wagering activity and a graphical representation of a beverage container. A game controller controls play of the wagering game, randomly selects an amount of beverage to be added to the displayed graphical representation of the beverage container in response to play of the wagering game, and animates an increment of the beverage in the beverage container with the amount of beverage selected. An output mechanism that is physically actuatable by a player, and awards a beverage when the beverage container is full and activated by the player.

In yet other embodiments, a method of awarding a non-cash prize for use with a gaming device is provided. The gaming device includes a credit input mechanism that receives a physical item representing a monetary value. The credit balance increases and decreases based on wagering activity. A display displays the wagering game based on the wagering activity and a graphical representation of a beverage container. An output mechanism can be physically actuated by a player. The method includes randomly selecting via the game controller an amount of beverage to be added to the game container based on the wagering activity, animating on the display an increment of the beverage in the beverage container with the amount of beverage selected, determining if the output mechanism has been physically actuated, and if the container has been completely filled with the beverage, and awarding via the output mechanism a beverage when the beverage container is full and activated by the player.

Still other features, aspects, and advantages of embodiments will become more fully apparent from the following detailed description, the appended claims, and the accompanying drawings illustrating a number of example embodiments and implementations, including the best mode contemplated for carrying out the embodiments. Embodiments may also be capable of other and different applications, and several details may be modified in various respects, all without departing from the spirit and scope of the disclosed embodiments. Accordingly, the drawings and descriptions are to be regarded as illustrative in nature, and not as restrictive. The drawings are not necessarily drawn to scale.

DRAWING DESCRIPTIONS

In the drawings, various dimensions may be exaggerated for illustrative clarity. Additionally, like reference numbers are utilized to refer to like elements throughout the present disclosure.

DESCRIPTION

Various aspects of the present disclosure are directed to gaming systems and game devices that award a player ancillary non-cash prizes, regardless of game play outcomes.

In such embodiments, the gaming device for awarding a beverage to a player playing a wagering game. The gaming device includes a credit input mechanism that receives a physical item representing a monetary value. The credit balance increases and decreases based on wagering activity. A display displays the wagering game based on the wagering activity and a graphical representation of a complimentary item or service ("comp") such as a beverage container. A game controller controls play of the wagering game and randomly determines an amount of the comp to be graphically added to the displayed graphical representation of the comp in response to play of the wagering game. An output mechanism awards a comp when the displayed graphical representation of the comp is full and activated by the player.

Exemplary beverage may include alcoholic drinks. Alcoholic drinks may include, but are not limited to, Vodka, gin, baijiu, tequila, rum, whisky, brandy, Singani, soju, beer, lager, sahti, ales, Cauim, Chicha, Cider, Plum jerkum, desi daru, Huangjiu, Icariine Liquor, Kasiri, Kilju, Kumis, mead, Nihamanchi, palm wine, Parakari Pulque, Sakurá, Sake, Sonti, Tepache, Tiswin, Tonto, wine, fortified wine, fruit wine, table wine, Sangria, sparkling wine, Champagne, spirits, hard soda, and the like. Exemplary beverage may also include non-alcoholic drinks. Non-alcoholic drinks may include, but are not limited to, juice, tea, wine, soda, hot chocolate, soup, popcorn, milk, coffee, lemonade, punch, and the like. Exemplary containers may include, but are not limited to, mugs, cups, tea pots, wine glasses, kettles, plates, martini glasses, shot glasses, beer bottles, beer cans, soda bottles, soda cans, beaker, blackjack, stein, tankards, chalices, goblet, noggins, beer keg, jugs, pitchers, jars, bowls, cannikins, demitasses, draughts, grails, steins, tasters, tumblers, vessels, and the like.

Although beverages and beverage containers are discussed, other ancillary non-cash prizes or complimentary items or services ("comps") may be awarded. Exemplary ancillary non-cash prizes or comps may include, but are not limited to, dinners, buffets, food, sandwiches, burgers, ice creams, popcorn, pizza, Sushi, concert tickets, movie tickets, meals, discounted hotel rooms, bus tickets, exotic car rides, free hotel rooms, suites, villas, presidential suites, a package including "room, food, and beverage," airfare reimbursements, limo rides, show tickets, golf outings, free concierge services, private gaming areas, and private jet services.

Various advantages and features of the present disclosure will become apparent and more clearly understood in view of the detailed description, appended claims, and drawings of the present disclosure. In the following description, reference is made to drawings which show by way of illustration various disclosed embodiments that incorporate various aspects of the present disclosure. These embodiments are described in sufficient detail to enable those skilled in the art to make or use the disclose embodiments. Other embodiments may be utilized and that structural, logical, software, hardware, and electrical changes may be made without departing from the scope of the appended claims. The following description is, therefore, not to be taken in a limited sense.

Figure 1:
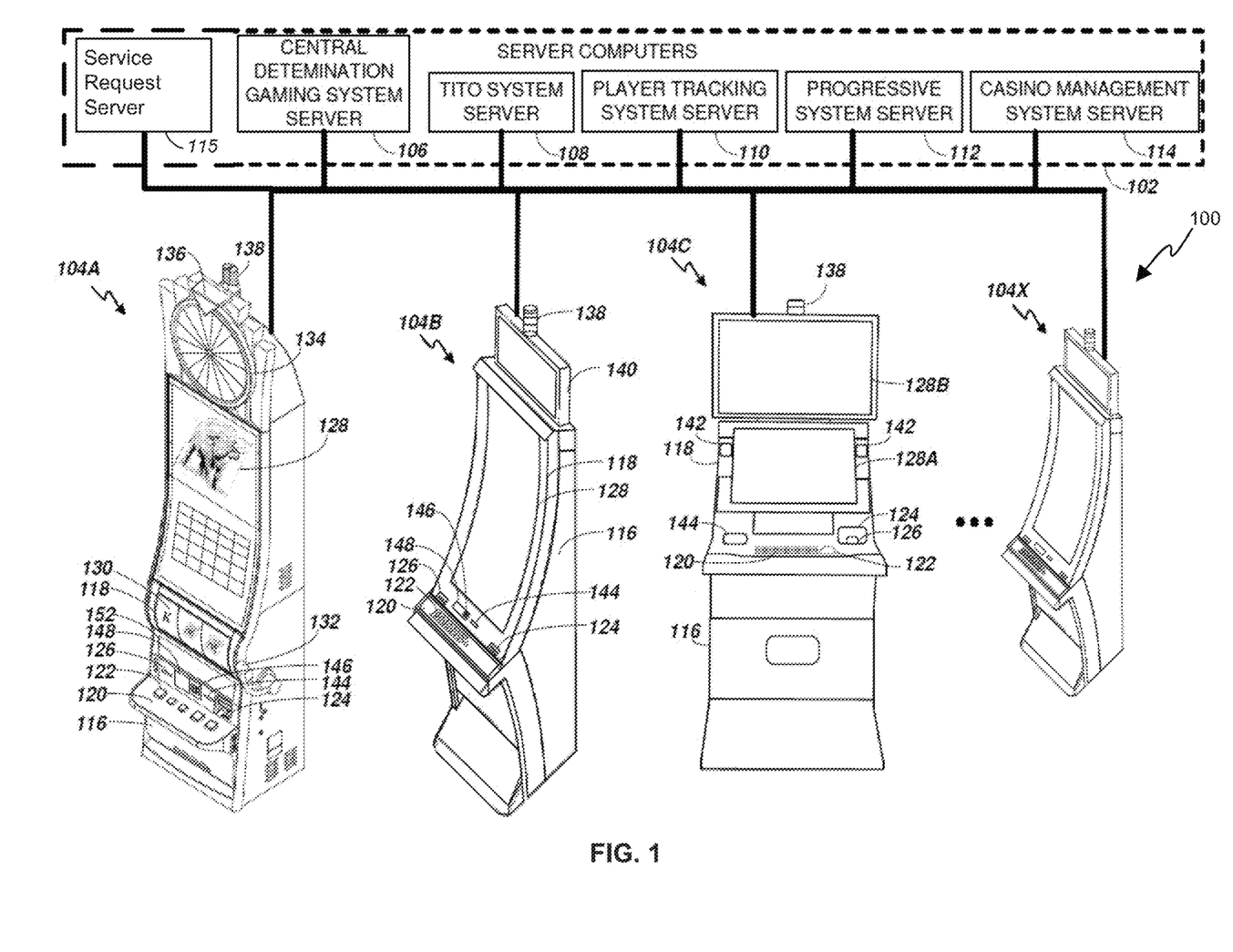
FIG. 1 is an exemplary diagram showing several electronic gaming machines (EGMs) networked with various gaming related servers.

FIG. 1 illustrates several different models of EGMs which may be networked to various gaming related servers. The present invention can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.) The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a Web site maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present invention may, in one or more embodiments, be practiced on a stand-alone gaming device such as gaming device 104A and/or a gaming device 104A in communication with only one or more other gaming devices 104B-104X (i.e., without server computers 102).

The server computers 102 may include a central determination gaming system server 106, a ticket-in-ticket-out (TITO) system server 108, a player tracking system server 110, a progressive system server 112, a casino management system server 114, and/or a service request server 115. Gaming devices 104A-104X may include features to enable operation of any or all servers for use by the player and/or operator (e.g., the casino, resort, gaming establishment, tavern, pub, etc.). For example, a game outcome may be generated on a central determination gaming system server 106 and then transmitted over the network to any of a group of remote terminals or remote gaming devices 104A-104X that utilize the game outcome and display the result to the player.

Gaming device 104A is often of a cabinet construction which may be aligned in rows or banks of similar devices for placement and operation on a casino floor. The gaming device 104A often includes a main door 116 which provides access to the interior of the cabinet. Gaming device 104A typically includes a button area or button deck 120 accessible by a player that is configured with input switches or buttons 122, a bill validator 124, and/or a ticket-out printer 126.

In FIG. 1, gaming machine or gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are then independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket (TITO) system). In such cashless embodiments, the gaming device 104A may also include a ticket-out printer 126 for outputting a credit ticket when a "cash out" button is pressed. Cashless ticket systems are well known in the art and are used to generate and track unique bar-codes that are printed on tickets to allow players to avoid the use of bills and coins by loading credits using a ticket reader and cashing out credits using a ticket-out printer 126 on the gaming device 104A.

In some embodiments, a player tracking card reader 144, a transceiver for wireless communication with a player's smartphone, a keypad 146, and/or an illuminated display 148 for reading, receiving, entering, and/or displaying player tracking information can be provided. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panels 152 may be implemented as an additional video display.

Gaming devices 104A have traditionally also included a handle 132 typically mounted to the side of main cabinet 116 which may be used to initiate game play.

Figure 2:
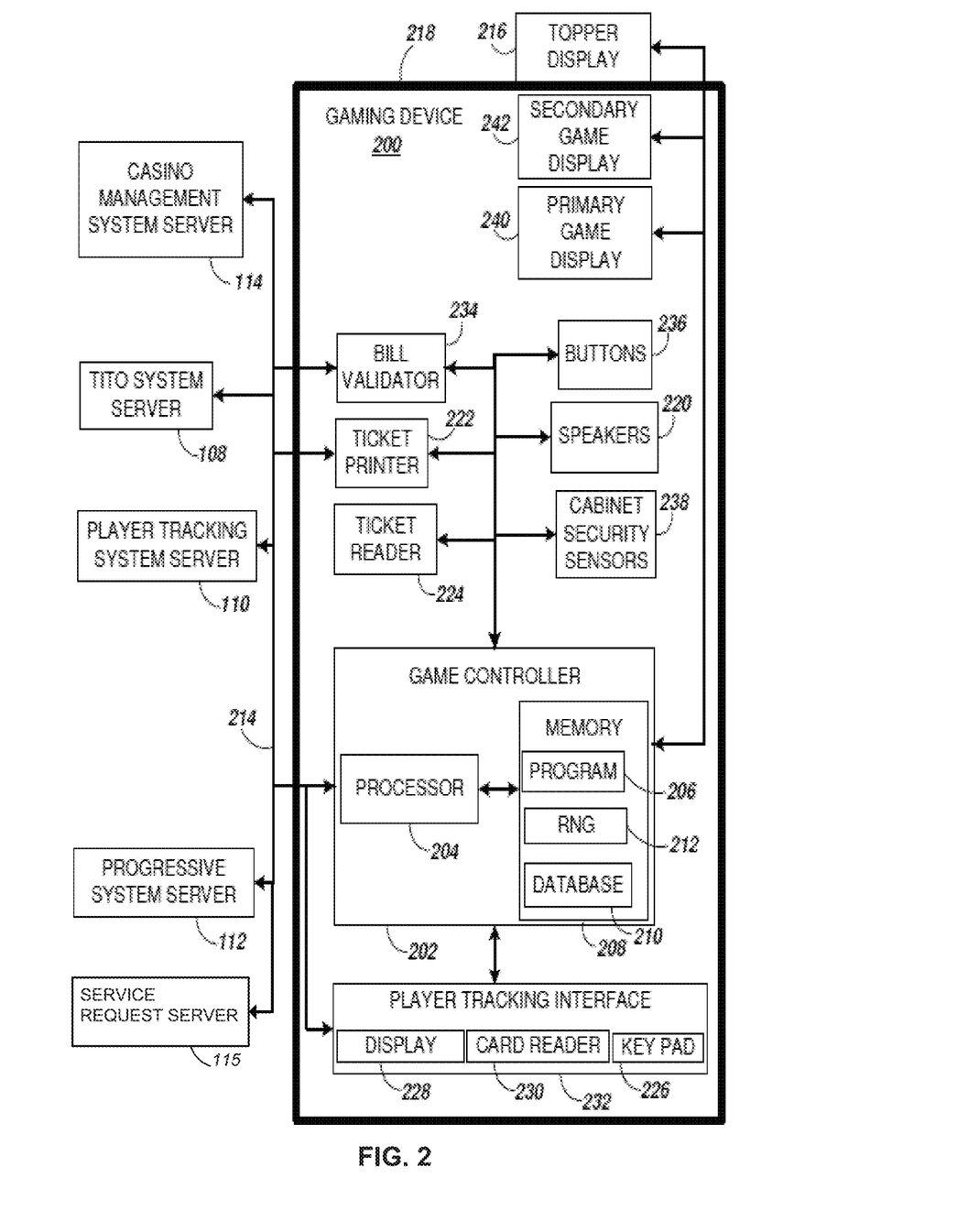
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present invention necessarily include top wheels, top boxes, information panels, cashless ticket systems, and/or player tracking systems. Further, some suitable gaming devices have only a single game display that includes only a mechanical set of reels and/or a video display, while others are designed for bar tables or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. A topper screen 140 may be used as a secondary game display for bonus play, to show game features or attraction activities while the game is not in play, or any other information or media desired by the game designer or operator. In some embodiments, topper screen 140 may also or alternatively be used to display progressive jackpot prizes available to a player during play of gaming device 104B.

Example gaming device 104B may include a main cabinet 116 including a main door 116 which opens to provide access to the interior of the gaming device 104B. The main or service door 116 is typically used by service personnel to refill the ticket-out printer 126 and collect bills and tickets inserted into the bill validator 124. The door 116 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A, while in landscape orientation, has a curvature radius from top to bottom. In some embodiments, main display 128A can be a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG 212) that can be implemented in hardware and/or software is typically used to generate random numbers that are used in the operation of game play to ensure that game play outcomes are random and meet regulations for a game of chance.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits on top of main cabinet 218. The main cabinet 218 or topper display 216 may also house a number of other components which may be used to add features to a game being played on gaming device 200, including speakers 220, a ticket printer 222 which prints bar-coded tickets, a ticket reader 224 which reads bar-coded tickets, and a player tracking interface 232a. The player tracking interface 232a may include a keypad 226 for entering player tracking information, a player tracking display 228 for displaying player tracking information (e.g., an illuminated or video display), and a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the main cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered and time of play) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements and 4) fault tolerance requirements. These differences require substantial engineering effort and often additional hardware.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to continue playing. Auditory effects include various sounds that are projected by the speakers 220. Visual effects include flashing lights, strobing lights or other patterns displayed from lights on the gaming device 200 or from lights behind the information panel 152 (FIG. 1). In some embodiments, a player may also request ancillary non-cash awards regardless of winning or losing through the service request server 115 to handle some or all of mechanical service requests for malfunctioning machines, slot floor person requests for jackpot handpays, and/or cocktail waitress requests for beverage service.

When the player is done, he/she cashes out the credit balance (typically by pressing a cash-out button to receive a ticket from the ticket printer 222). The ticket may be "cashed-in" for money or inserted into another machine to establish a credit balance for play.

Figure 3A:
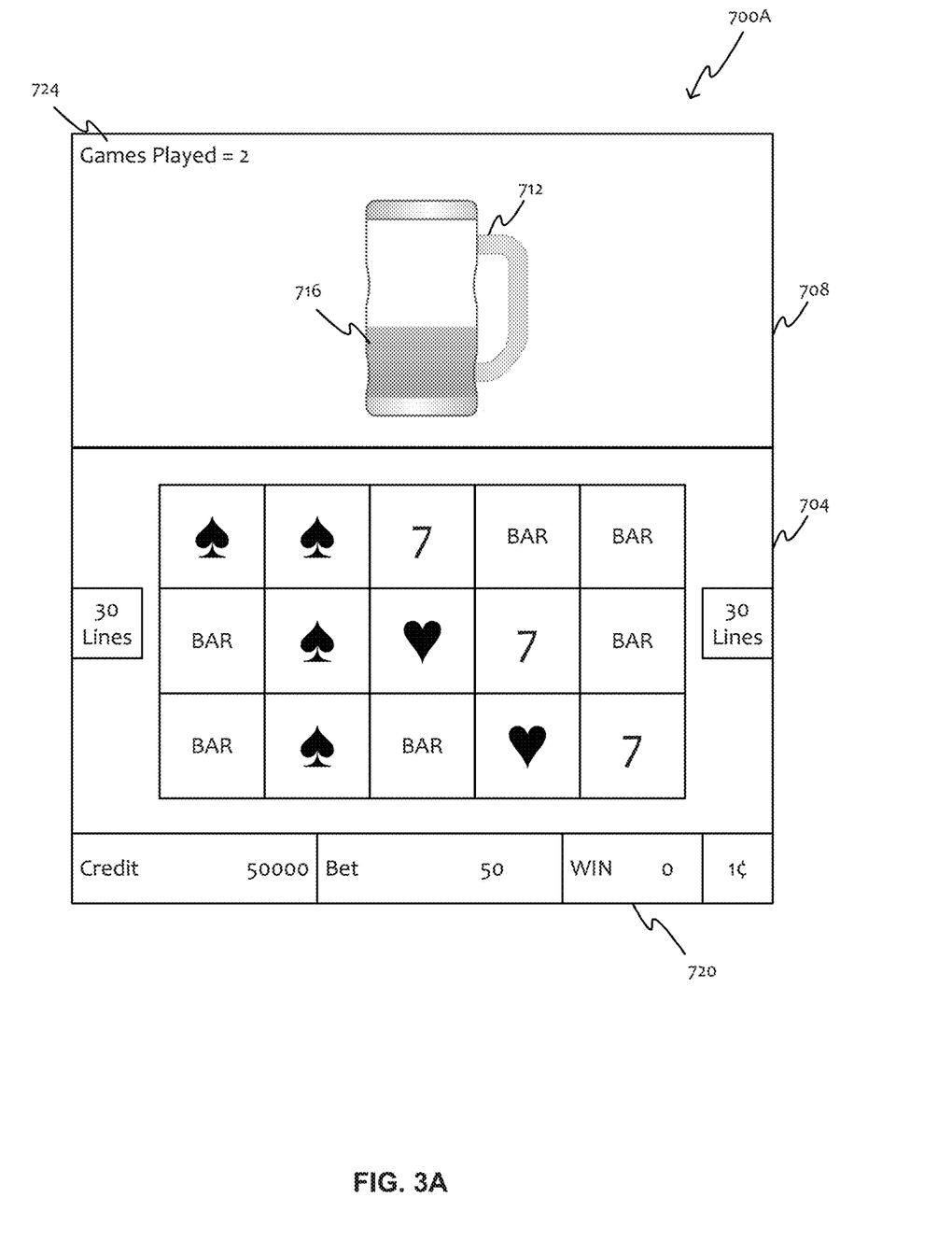
FIG. 3A depicts a first exemplary screenshot of the displays of the EGM of FIG. 2.

FIG. 3A shows a first exemplary screenshot 700A that includes a first display 704, and a second display 708. In some embodiments, the first display 704 may include either or both the primary game display 240 and the secondary game display 242 of the gaming device 200 in FIG. 2. In some embodiments, the second display 708 may include one of the topper display 216 and the display 228 of the player tracking interface 232 of FIG. 2. In some other embodiments, the first display 704 and the second display 708 may simultaneously occupy the primary display 240, for example, the primary game display 240, or the secondary game display 242 of the gaming device 200 in FIG. 2. As shown in FIG. 3A, the second display 708 displays a graphical representation of a container 712 in the form of a beer stein, with an amount of beverage 716 in the form of a beer. In other embodiments, the second display 708 may display a graphical representation of a voucher, with a level of complimentary item or service ("comp") being accumulated. In some embodiments, the container 712 is initialized to have zero amount of beverage.

In the embodiment, the first display 704 also shows via a win meter 720 that indicates a player has won zero (0) credits, and optionally, the second display 708 shows that the player has played two games via an indicator 724. As such, the player has not won anything in two games, and the container 712 has been partially filled with an amount of beverage 716. In some other embodiments, the container 712 is to be filled with an amount of beverage based on an occurrence of wagering activity, or game play, regardless of win or lose.

Figure 3B:
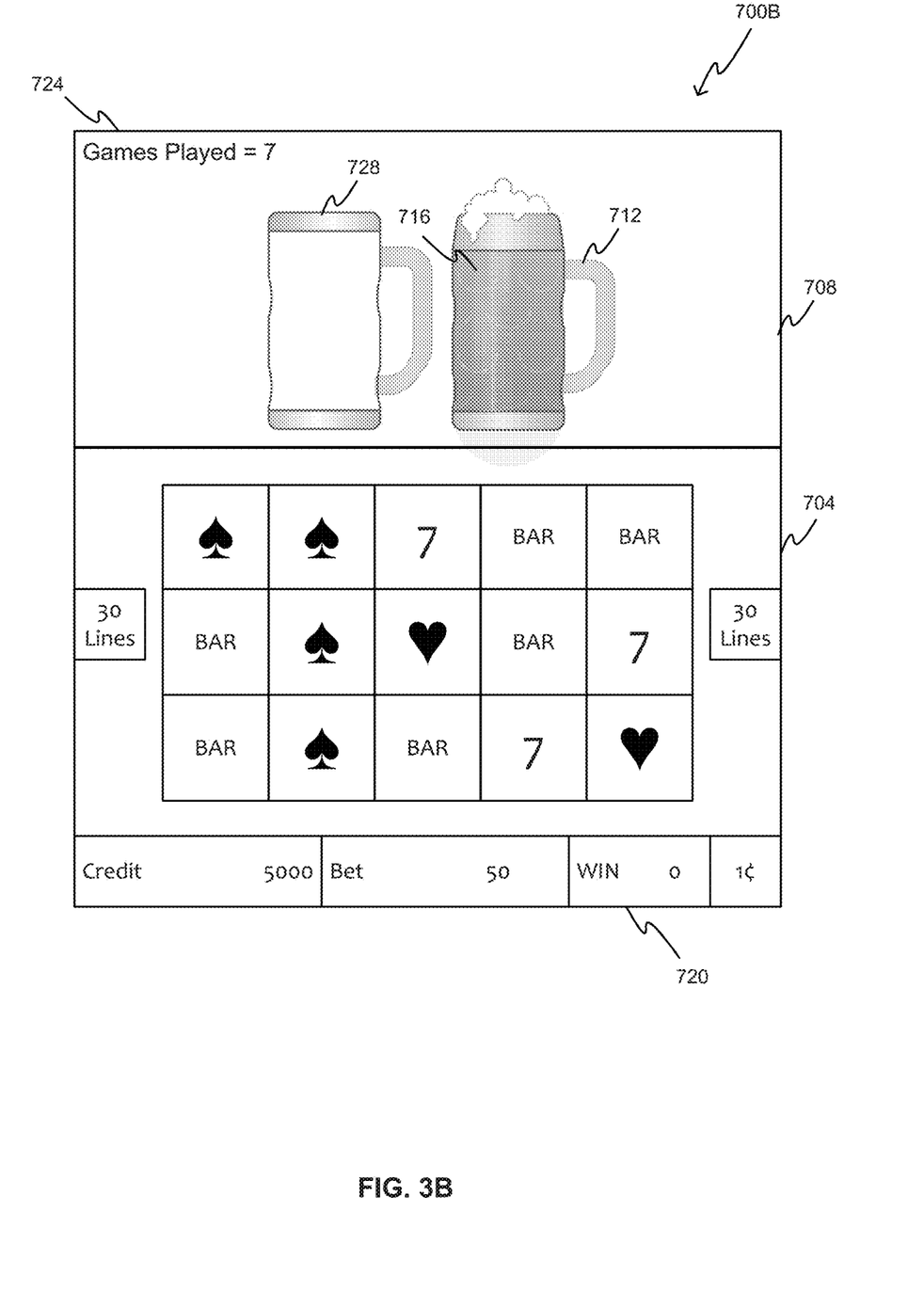
FIG. 3B depicts a second exemplary screenshot of the displays of the EGM of FIG. 2.

FIG. 3B shows a second exemplary screenshot 700B, where the player has played seven games and has completely filled the container 712. That is, the beer stein in FIG. 3A is full of beer. In the embodiment, the player has not physically actuated an output mechanism (e.g., buttons 236 of FIG. 2 and/or the ticket printer 222 of FIG. 2, via the service request server 115) after the container 712 has been completely filled with the beverage 716, and the second display 708 displays a graphical representation of a second container 728 in the form of a second beer stein that is empty. For example, after the container 712 has been completely filled with the beverage 716, the player may actuate a button 236 to inform the service request server 115 that the player wants a beverage. In some cases, the beverage may be delivered by hand. In other cases, a ticket may be generated when the ticket printer 222 has been actuated via TITO system server 108, and the player may obtain the beverage with the ticket at a nearby bar. Of course, other methods of delivery may be used.

Figure 3C:
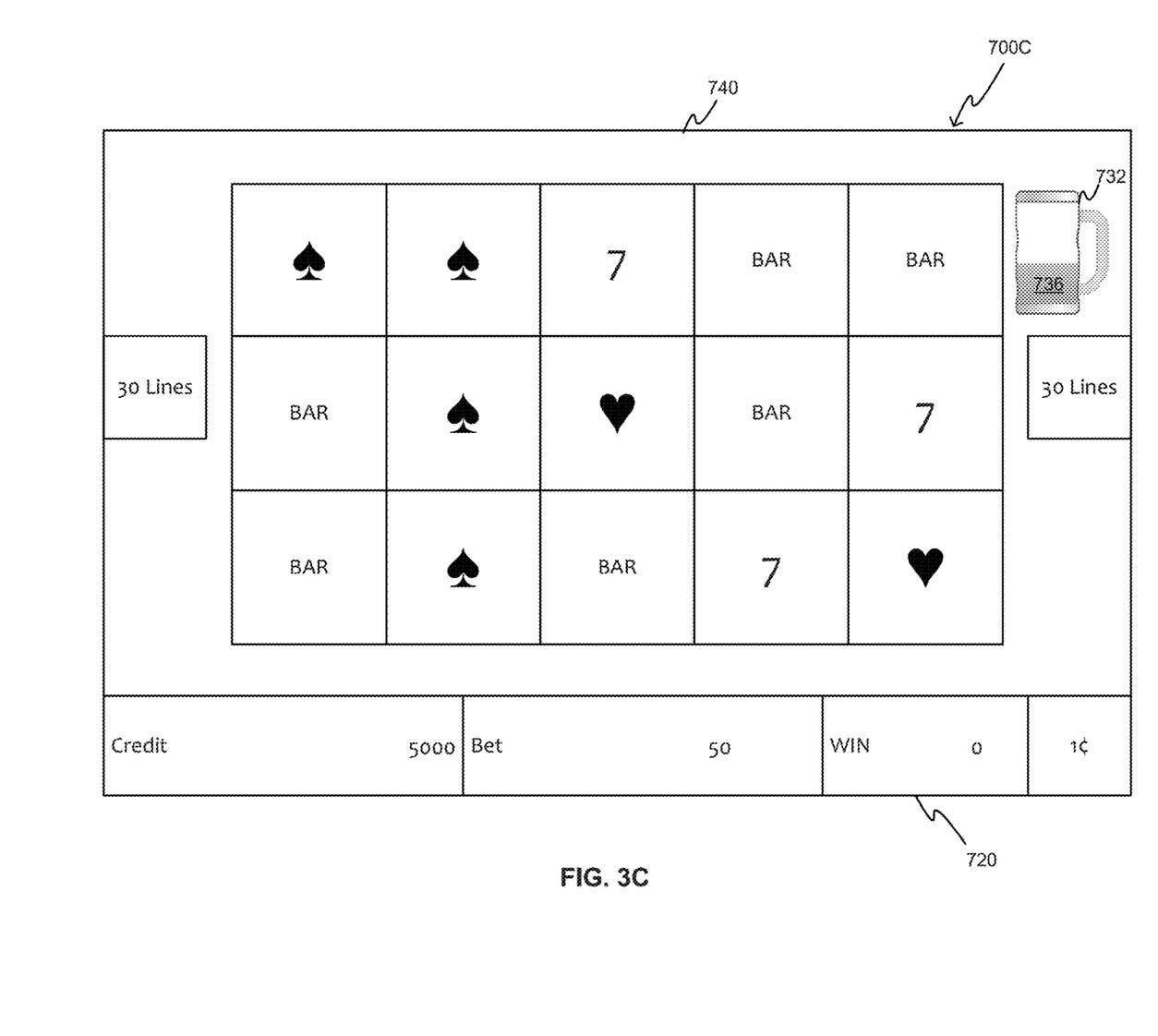
FIG. 3C shows a third exemplary screenshot of the displays of the EGM of FIG. 2.
Figure 3D:
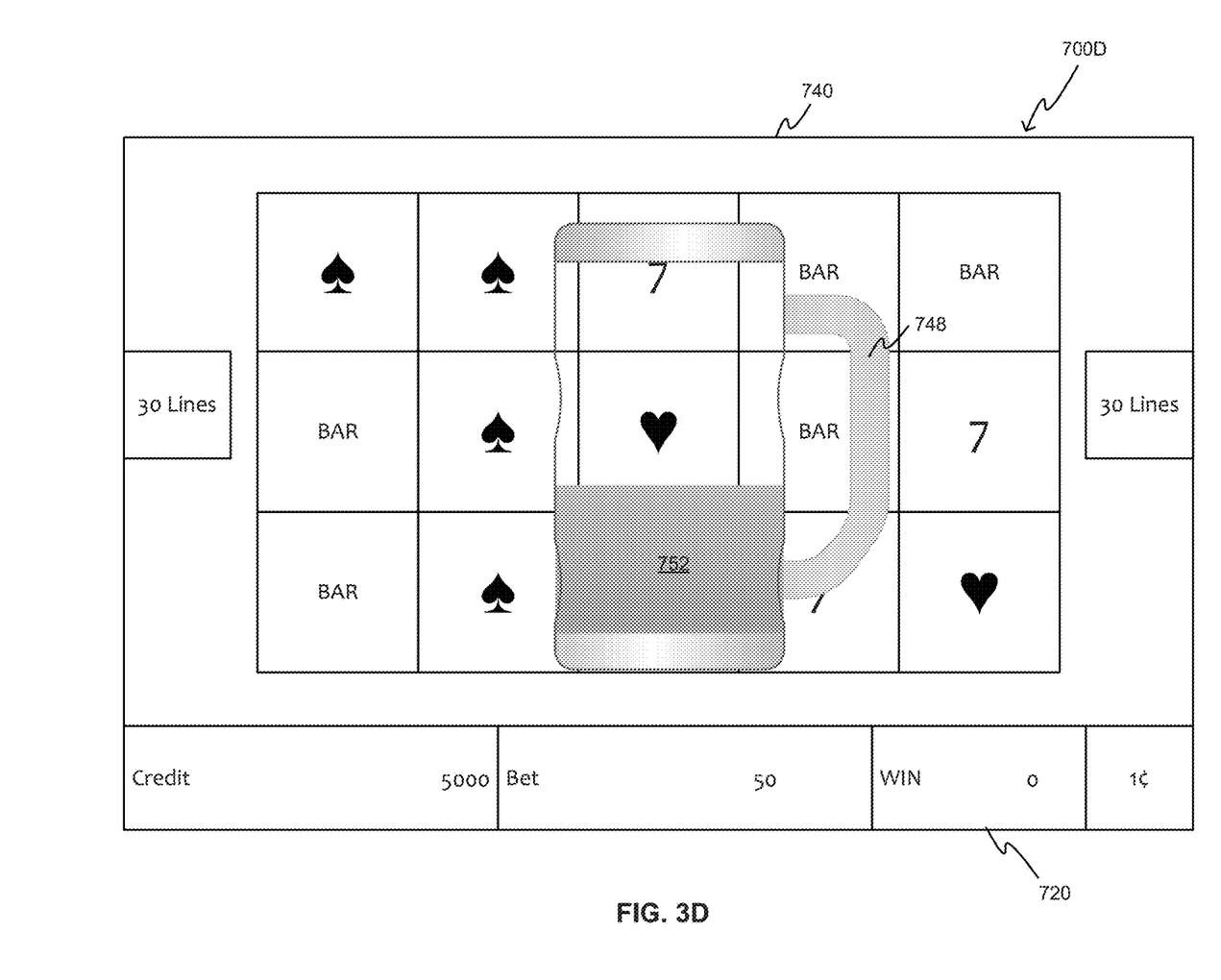
FIG. 3D shows a fourth exemplary screenshot of the displays of the EGM of FIG. 2.
Figure 3E:
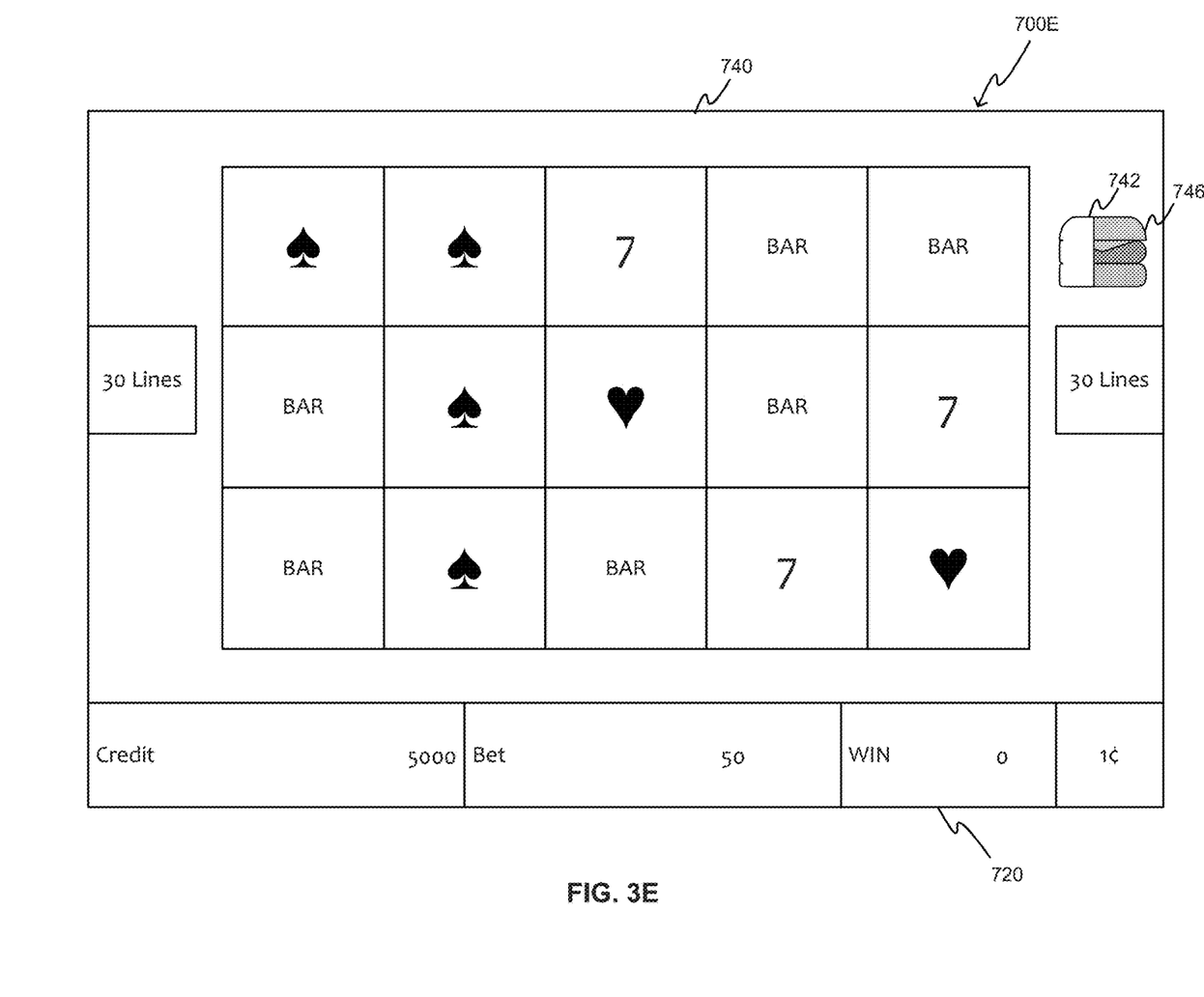
FIG. 3E shows a fifth exemplary screenshot of the displays of the EGM of FIG. 2.

In some embodiments, if the player leaves after a few games with a partially filled container 712, the player tracking system server 110 may store an amount of beverage already in the container 712 and associate the container 712 and the amount of beverage with the player so that the container 712 may be filled later when the player resumes playing. Similarly, FIG. 3C shows a third exemplary screenshot 700C that shows a container 732 in the form of a beer stein having beverage 736 being displayed adjacent a game display 740. In the embodiment, the first display 704 also shows via the win meter 720 that indicates a player has won zero (0) credits. FIG. 3D shows a fourth exemplary screenshot 700D that shows a container 748 in the form of a beer stein having beverage 752 being displayed adjacent a game display 740. FIG. 3E shows a fifth exemplary screenshot 700E that shows a graphical representation of a complimentary item in the form of a cheese burger 742. FIG. 3E also shows a portion 746 of the cheese burger 742 indicative of an amount of the cheese burger 742 that has been accumulated. When a player has completely filled the cheese burger 742, the game controller 202 awards a cheese burger to the player, for example, via a voucher.

Figure 4:
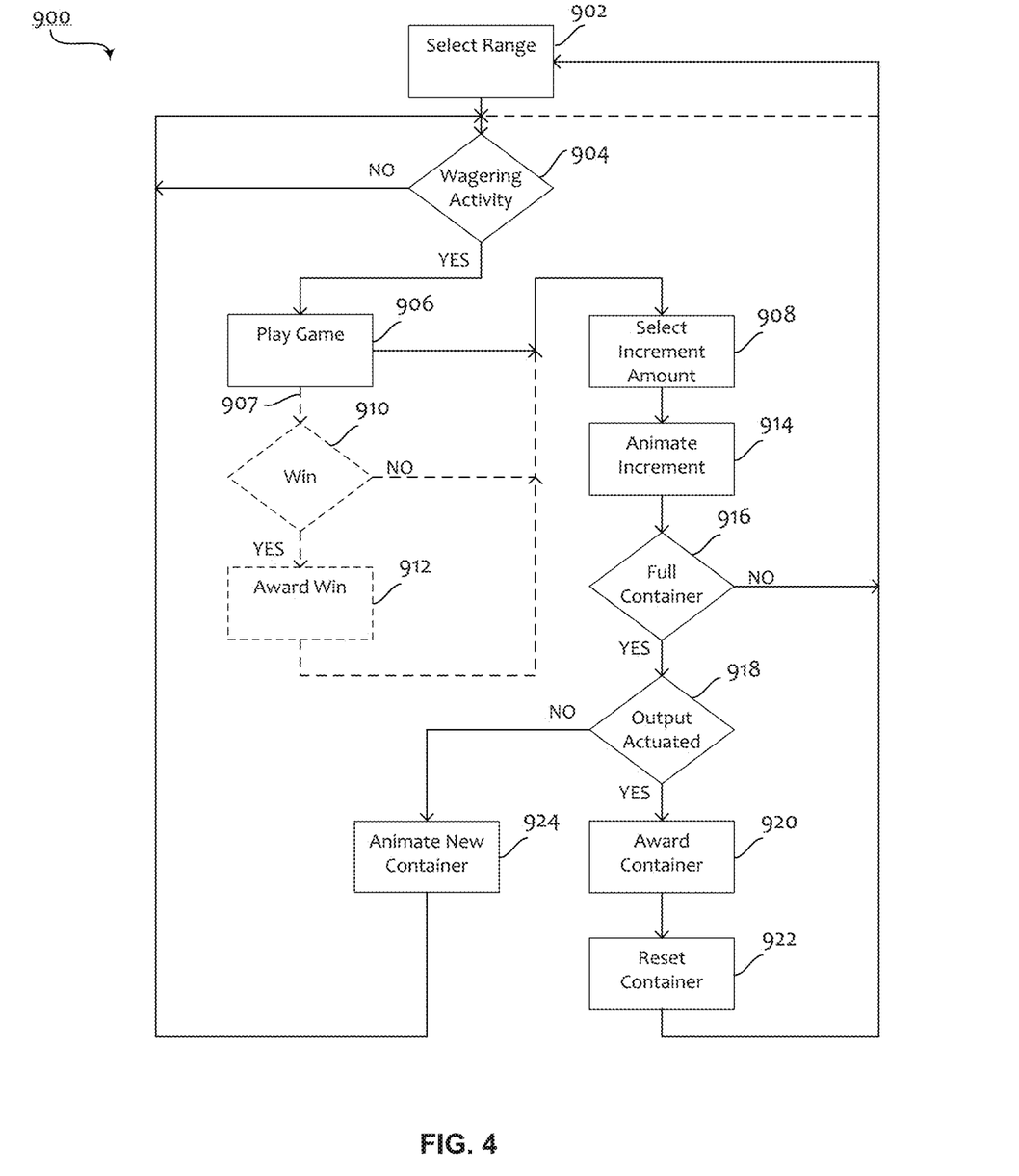
FIG. 4 depicts a flow chart of an exemplary award process.

Referring to FIG. 4, which illustrates a flow chart of an award process 900. At block 902, the award process 900 selects a range via the game controller 202 (of FIG. 2) from range data that is stored in database 210 of FIG. 2. The range generally defines a rate at which the container 712 may be filled with the beverage 716. That is, in the embodiment shown, the range defines how fast a beer stein is filled. In some embodiments, a casino operator may preset a range between 5% and 7% of a capacity of the container 712. In some other embodiments, the range may be randomly determined. For example, if the range is between 5% and 7%, and if the container 712 is filled 5% every time the game is played, the container 712 may need 20 (100%/5%=20) games to be filled in the worst case scenario, and 16 (100%/7%=16) games to be filled in the best case scenario. In some embodiments, the range may be determined before or after any wagering activity, but before selecting an amount of the beverage 716 to be added to the container 712. In some embodiments, the range may be fixed percentages of the capacity (e.g., between 5% and 7%) of the container 712, regardless of whether the container 712 has been awarded and reset. In some other embodiments, the range may change after the container 712 has been awarded. For example, after a completely filled container has been awarded, a current range (e.g., between 5% and 7%) of the container may be changed to a new range (e.g., between 8% and 12%) in a subsequent game.

Referring back to FIG. 4, the award process 900 monitors for an occurrence of wagering activity, for example, via the buttons 236 and/or the game controller 202 (of FIG. 2) at block 904. In some embodiments, the game controller 202 may monitor whether a credit input mechanism, such as, for example, the bill validator 234 (of FIG. 2) or the card reader 230 (of FIG. 2), has received a physical item (e.g., a bill or a player card) representing a monetary value to establish a credit balance. Based on the wagering activity, the credit balance may be increased after the game has been won, or decreased to initiate the game.

In response to the award process 900 determining that a wagering activity has occurred or that a game is played, the award process 900 proceeds to initiate or play a game at block 906 associated with a credit balance on a display, for example, primary game display 240, and/or secondary game display 242. After initiating the game at block 906, the award process 900 uses the same increment amount regardless of winning or losing at block 908. Alternatively, as shown with respect to optional path 907, after initiating the game at block 906, the award process 900 determines at block 910 if a win results from the game, and awards the win at block 912 if a win results from the game. However, if the player does not win, as determined at block 910, the award process 900 selects an increment amount of the beverage 716 (of FIG. 3) at block 908 due to losing. In some embodiments, the increment amount of the beverage 716 to be added due to a losing outcome or a losing streak is larger than the increment amount of the beverage 716 to be added after a win.

In some embodiments, the game controller 202 uses the RNG 212 to randomly select the increment amount. For example, the increment amount may be selected to be 6% from a predetermined range between 5% and 7% in a current game, and may be selected to be 7% from the range in a subsequent game. For example, the increment amount may be selected to be 6% from a range between 5% and 7% for a container for all games before the container has been awarded. In other embodiments, the increment amount is a fixed amount. As such, in some embodiments, the amount of beverage to be added due to a losing outcome may be randomly selected from a larger range. Similarly, the amount of beverage to be added due to a losing outcome may be randomly selected from an even larger predetermined range, for example, between 5% and 7%. Conversely, the amount of beverage to be added after a win outcome may be randomly selected from a smaller predetermined range, for example, between 3% and 5%.

After selecting the increment amount at block 908, the award process 900 causes a display, for example, the topper display 216, display 228 of FIG. 2, or the game display, for example, the primary game display 240, or the secondary game display 242 of FIG. 2, to display or animate an increment of the beverage 716 in the container 712 by the amount of beverage selected at block 914. In some embodiments, although not shown, the animation may include pouring the beverage from another beverage container into the container 712, with optionally audio and/or visual effects.

The award process 900 then determines at block 916 if the container 712 has been completely filled. If the container 712 has been completely filled with the beverage, the award process 900 determines if the output mechanism has been physically actuated at block 918. If the output mechanism has been physically actuated as determined at block 918, the award process 900 awards at block 920 the container 712, and resets the container 712 at block 922, for example, by emptying the container 712. In some embodiments, awarding the container 712 may include printing a voucher or a ticket so that the player may obtain the beverage at a nearby bar, or other dispensing sources. In other embodiments, awarding the container 712 may include requesting a beverage delivery through the service request server 115 and the player tracking interface 232. However, if the output mechanism has not been physically actuated as determined at block 918, the award process 900 awards at block 924 causes an animation of a second container (e.g., the second container 728 of FIG. 3B) as discussed above.

In some embodiments, after resetting the container 712 at block 922, the award process 900 proceeds to block 902 to re-determine the range. In some other embodiments, after resetting the container 712 at block 922, the award process 900 proceeds to block 904 to monitor the occurrence of wagering activity. In such cases, the range remains the same for the container 712.

While the disclosure has been described with respect to the figures, it will be appreciated that many modifications and changes may be made by those skilled in the art without departing from the spirit of the invention. Any variation and derivation from the above description and figures are included in the scope of the present disclosure as defined by the claims.

What is claimed is:

1. A gaming device for awarding a beverage to a player playing a game, the gaming device comprising:
    a player-tracking interface operable to receive inputs or selections;
    a credit input operable to establish a credit balance;
    a display configured to display the game and a graphical representation of a beverage container;
    a game controller comprising a hardware-implemented random number generator, a processor and a memory storing instructions, which, when executed cause the game controller to at least:
        generate a random outcome with the hardware-implemented random number generator,
        control play of the game, and
        randomly determine using the random outcome a random amount of beverage to be graphically added to the graphical representation of the beverage container displayed in response to play of the game regardless of any outcome of the game; and
    an output mechanism configured to award a beverage when the beverage container is full and in response to a request for a beverage delivery that is received through an actuation at the player tracking interface.

2. The gaming device of claim 1, wherein the game controller is further configured to randomly select from a predetermined range the random amount of beverage to be added.

3. The gaming device of claim 1, wherein the beverage container is a first beverage container, and wherein the display is further configured to display a second graphic al representation of a second beverage container in response to 1) the first beverage container having been completely filled with the beverage, and 2) the output mechanism not having been physically actuated.

4. The gaming device of claim 1, wherein the display is further configured to animate the random amount of beverage to be added to the beverage container.

5. The gaming device of claim 1, wherein when the beverage container is initially displayed, the beverage container is empty.

6. The gaming device of claim 1, wherein the output mechanism is further configured to award the beverage container as a ticket.

7. The gaming device of claim 1, wherein the instructions, when executed cause the game controller to randomly determine a range from which the random amount of beverage is determined to be graphically added to the graphical representation of the beverage container displayed.

8. A gaming device for awarding a beverage to a player playing a game, the gaming device comprising:
    a credit input operable to establish a credit balance;
    a display configured to display the game and a graphical representation of a beverage container;
    a game controller comprising a hardware-implemented random number generator and a memory storing instructions, which, when executed cause the game controller to at least:
        generate a random outcome with the hardware-implemented random number generator,
        control play of the game,
        randomly select using the random outcome a random amount of beverage to be added to the graphical representation of the beverage container displayed in response to play of the game regardless of any outcome of the game, and
        animate an increment of the beverage in the beverage container with the random amount of beverage selected; and
    an output mechanism being physically actuatable, and configured to dispense a beverage when the beverage container is full and the output mechanism has been physic ally activated.

9. The gaming device of claim 8, wherein the beverage container is a first beverage container, and wherein the display is further configured to display a second beverage container in response to 1) the first beverage container having been completely filled with the beverage, and 2) the output mechanism not having been physically actuated.

10. The gaming device of claim 8, wherein when the beverage container is initially displayed, the beverage container is empty.

11. The gaming device of claim 8, wherein the output mechanism is further configured to award the beverage container as a ticket.

12. The gaming device of claim 8, wherein the instructions, when executed cause the game controller to randomly determine the random amount of beverage to be graphically added to the graphical representation of the beverage container displayed from a predetermined range.

13. A method of awarding a non-cash prize for use with a gaming device playing a game, and having a credit input operable to establish a credit balance, a game controller comprising a hardware-implemented random number generator and a memory storing instructions, which, when executed cause the game controller to control play of the game, and a display configured to display the game and a graphical representation of a beverage container to be filled with a beverage, and an output mechanism being physically actuatable, the method comprising:

generating a random outcome with the hardware-implemented random number generator;

randomly selecting using the random outcome via the game controller a random amount of beverage to be added to the beverage container in response to play of the game regardless of any outcome of the game;

animating on the display an increment of the beverage in the graphical representation of the beverage container with the random amount of beverage selected;

determining if the output mechanism has been physically actuated, and if the graphical representation of the beverage container has been completely filled with the beverage; and awarding, by the output mechanism, a beverage when the graphical representation of the beverage container is full and the output mechanism has been activated.

14. The method of claim 13, wherein the beverage container is a first beverage container, and further comprising displaying on the display a second beverage container in response to 1) the first beverage container having been completely filled with the beverage, and 2) the output mechanism not having been physically actuated.

15. The method of claim 13, further comprising initializing initial amount of beverage in the beverage container to zero when the graphical representation of the beverage container is initially displayed.

16. The method of claim 13, further comprising awarding via the output mechanism the graphical representation of the beverage container as a ticket.

17. The method of claim 13, further comprising randomly selecting the random amount of beverage to be added to the graphical representation of the beverage container in response to having detected an occurrence of the game from a predetermined range.

18. The method of claim 13, further comprising dispensing the beverage from the gaming device, when the beverage container is graphically depicted as full and the output mechanism has been physically activated.

* * * * *